Jan. 22, 1929.

H. COLE 1,699,607

MEANS FOR OPENING MILK BOTTLES AND THE LIKE

Filed July 16, 1928

Inventor.
Herbert Cole
By Emil Bömelycke
Attorney

Patented Jan. 22, 1929.

1,699,607

UNITED STATES PATENT OFFICE.

HERBERT COLE, OF STAMFORD HILL, ENGLAND, ASSIGNOR TO PRESTOP LIMITED, OF LONDON, ENGLAND.

MEANS FOR OPENING MILK BOTTLES AND THE LIKE.

Application filed July 16, 1928, Serial No. 293,165, and in Great Britain September 13, 1927.

This invention relates to a device for opening milk bottles, cartons and like receptacles of the kind which are sealed by means of cardboard discs or the like.

The chief object of this invention is to provide a simple and effective device which has no slidable or relatively movable parts and which is constructed so as to effect the removal of the said sealing disc or the like by applying the device upon the mouth of the bottle or the like and withdrawing it therefrom without the necessity of turning the device while applying it in position or of any special method of operation.

A further object is to provide a device of the character referred to which is adapted to form a hygienic cover for the bottle or the like after the sealing disc or the like has been extracted and which is practically indestructible.

According to the invention, a device for the purpose referred to comprises a disc-like cover, preferably circular in shape, adapted to be applied upon the mouth of the milk bottle or the like and fitted or provided with a downwardly extending member adapted to pierce the sealing disc or the like when the cover or casing is pressed downwardly and to extract the said disc or the like when the cover is removed from the milk bottle or the like. The depending member comprises a metal bar, strip or the like rigidly secured to the cover at its upper end and having its lower end of conical, pointed or barbed formation and of such shape as to afford a shoulder or the like adapted to engage beneath the sealing disc to effect its extraction when the device is removed from the bottle or the like. The cover or casing is preferably flanged so as to extend over the edge of the milk bottle or the like when applied thereon.

The invention is hereinafter described by way of example with reference to the accompanying drawings, in which:—

Figure 1:
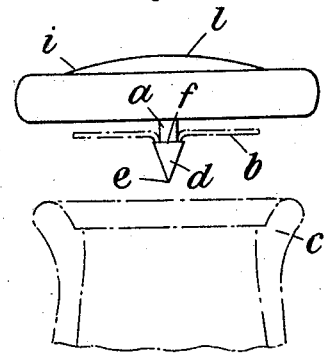
Figure 1 is an elevation of one form of the device showing the sealing disc removed from a bottle, the neck of which is shown by dotted lines.
Figure 2:
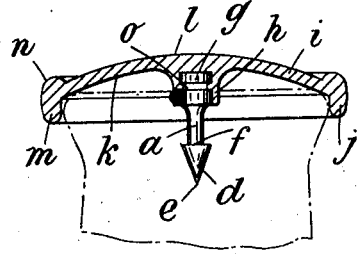
Figure 2 is a cross-section of the device shown in Figure 1.
Figure 3:
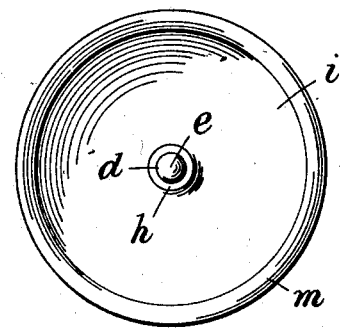
Figure 3 is an inverted plan thereof.
Figure 4:
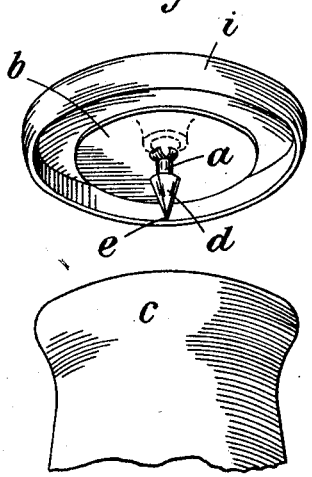
Figure 4 is a perspective view showing the neck of a milk bottle and the device, together with the sealing disc, spaced therefrom.

As shown, the improved device comprises a downwardly extending member $a$ which is so shaped at one end thereof as to be capable of piercing and extracting a sealing disc $b$ or the like from a milk bottle, carton or other receptacle $c$. The said downwardly extending member $a$, preferably formed of a rod of metal, such as stainless or plated steel, has its lower end of conical formation as shown at $d$ so as to provide a pointed end $e$ which is adapted to pierce the disc $b$. The diameter of the downwardly extending member $a$ above the said conical end $d$ is reduced to form a shoulder $f$ which is adapted to engage beneath the disc $b$ when the latter has been pierced, so that on removal of the device the disc is extracted. The upper portion $g$ of the downwardly extending member $a$ may be of any desired shape and is adapted to be fixed into a boss $h$. This boss $h$ is formed on the inner side of a substantially circular disc-like cover $i$ which may be flanged at its periphery as indicated at $j$. The disc-like cover $i$ may be recessed on its under side so as to provide a concave under surface $k$ and may be of convex shape on its upper surface as indicated at $l$.

The part $j$ is preferably provided with a downwardly extending flange $m$ which is adapted to fit over the neck of the bottle, the flange $m$ preferably being rounded on its outer periphery and having a rounded upper edge $n$ which is adapted to enhance the appearance of the device. The cover $i$ is preferably constructed of a phenol condensation product, or like material, suitably coloured and ornamented. The downwardly extending member $a$ may be in the form of a bar, strip or the like of metal or of any other suitable material and of any appropriate form in cross-section, having its end pointed or barbed to enable it to pierce the disc $b$ and to withdraw it when the cover $i$ is lifted from the milk bottle $c$. The downwardly extending member $a$ may be screw threaded into or otherwise connected to the disc-like cover $i$ or it may be fixed into a hole or recess in the cover by means of a transverse rivet or by a suitable adhesive, or by both. In the construction shown the upper part $g$ of the member $a$ is formed with a groove $o$ into which the material of the cover $i$ is adapted to be pressed in the moulding operation to firmly secure the member $a$ to the cover $i$.

In operation, when it is desired to remove the sealing disc $b$ from, for instance, the neck of a milk bottle $c$, the disc-like cover $i$ is applied over the neck of the bottle $c$ and forced downwardly so that the downwardly extending member $a$ pierces the sealing disc $b$ and so that the shoulder $f$ of the conical extension $d$ engages beneath the sealing disc. When the cover $i$ is removed it will be understood that the sealing disc $b$ will also be removed with the said cover. The cover $i$ can be replaced on the neck of the bottle $c$ to provide a hygienic cover for the contents of the bottle. The sealing disc $b$ itself may or may not be removed before the cover is so replaced, but it will be understood that the sealing disc $b$ can be readily withdrawn from the downwardly extending member $a$ when it is desired to employ the device for removing the sealing disc from another bottle.

What I claim is:—

1. A device for removing sealing discs from receptacles such as milk bottles, comprising a cover constructed of a mouldable material and adapted to be applied upon the mouth of the receptacle, and a downwardly extending member fixed at its upper end to the said cover, the part of the said downwardly extending member which extends into the cover having a recess into which the material of the cover is pressed in the course of manufacture so that the said downwardly extending member is fixedly secured to the said cover, and the said downwardly extending member having at its lower end an enlargement which is pointed so as to be capable of piercing the sealing disc and engaging beneath the latter for its withdrawal.

2. A device for removing sealing discs from receptacles such as milk bottles, comprising a circular disc constructed of a mouldable material, and having both a downwardly extending peripheral flange and an integral boss, and a downwardly extending member fixed at its upper end into the said boss, the part of the downwardly extending member which extends into the said boss having a recess into which the material of the disc is pressed in the course of manufacture so that the said downwardly extending member is fixedly secured to the said disc, and the said downwardly extending member having at its lower end an enlargement which is pointed so as to be capable of piercing the sealing disc and engaging beneath the latter for its withdrawal.

3. A device for removing sealing discs from receptacles such as milk bottles, comprising a circular disc constructed of a mouldable material, the said disc having a convex upper surface, a downwardly extending peripheral flange and a centrally disposed downwardly extending boss, and a downwardly extending member in the form of a cylindrical rod the upper part of which extends into the said boss and is provided with a recess into which the material of the disc is pressed in the course of manufacture so as to fix the said rod firmly in the said boss, the lower end of the rod being provided with a conical enlargement which is capable of piercing the sealing disc and engaging beneath the latter for its withdrawal.

4. A device for removing sealing discs from receptacles such as milk bottles, comprising a circular disc constructed of a mouldable material and having a boss, and a downwardly extending member in the form of a cylindrical rod, the upper part of which extends into the said boss and is provided with a recess into which the material of the disc is pressed in the course of manufacture so as to fix the said rod firmly in said boss, and the lower end of which rod is provided with a conical point capable of piercing the sealing disc, the intermediate part of the rod being of reduced diameter so as to afford a shoulder above the said conical point for engaging beneath the said sealing disc for its withdrawal.

5. A device according to claim 4, in which the recess in the upper part of the rod has the form of an annular groove.

In testimony whereof I hereunto affix my signature this 22nd day of June, 1928.

HERBERT COLE.